United States Patent [19]

Fink et al.

[11] Patent Number: 4,576,046

[45] Date of Patent: Mar. 18, 1986

[54] DEVICE FOR THE EXAMINATION OF OBJECTS BY MEANS OF ULTRASOUND ECHOGRAPHY

[75] Inventors: Mathias A. Fink, Strasbourg; Jean-François Cardoso, Paris, both of France

[73] Assignee: U.S. Philips Corporation, New York, N.Y.

[21] Appl. No.: 680,415

[22] Filed: Dec. 11, 1984

[30] Foreign Application Priority Data

Dec. 14, 1983 [FR] France ............................... 83 20042

[51] Int. Cl.$^4$ ............................................. G01N 29/04
[52] U.S. Cl. .......................................... 73/631; 73/602
[58] Field of Search ................... 73/631, 602; 128/660

[56] References Cited

U.S. PATENT DOCUMENTS

| 4,016,750 | 4/1977 | Green ..................................... 73/602 |
| 4,057,049 | 11/1977 | Hill ....................................... 128/660 |
| 4,446,737 | 5/1984 | Hottier .................................. 73/631 |
| 4,520,670 | 6/1985 | Salomonsson et al. ............... 73/602 |

Primary Examiner—Anthony V. Ciarlante
Attorney, Agent, or Firm—Jack E. Haken

[57] ABSTRACT

A device for scanning objects by means of ultrasound echography, comprising at least one ultrasound transducer (10) which is connected to a transmitter stage (20) and to a receiver stage (30) which comprises an amplifier (40), a correction circuit (50) for the correction of the gain as a function of time, and a processing circuit (60) for the processing of the results of the echographic examination. The receiver and processing stage also comprise a circuit (70) which is connected to the output of the assembly formed by the amplifier and the gain correction circuit and which comprises means for determining the instantaneous frequency and the instantaneous energy of the echographic signal, means for weighting the instantaneous frequency with the instantaneous energy, and a diffraction correction circuit (80).

4 Claims, 6 Drawing Figures

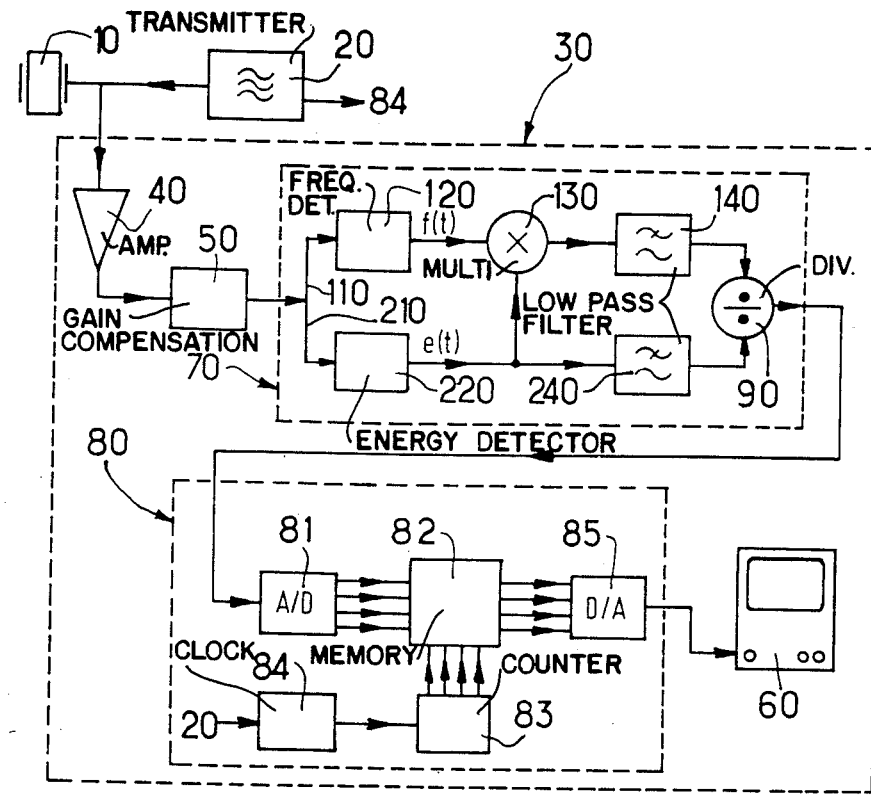
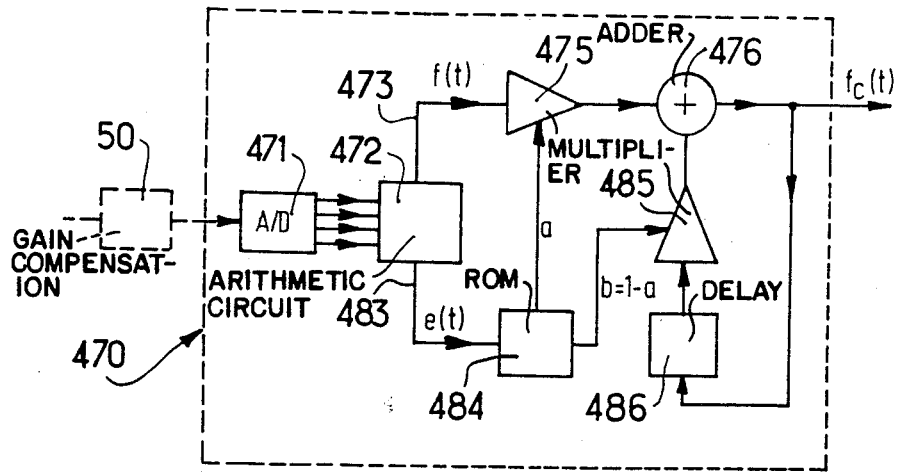
FIG.2
FIG.3

DEVICE FOR THE EXAMINATION OF OBJECTS BY MEANS OF ULTRASOUND ECHOGRAPHY

The invention relates to a device for the scanning of objects by means of ultrasound echography, comprising at least one ultrasound transducer which is connected to a transmitter stage for the transmission of electric signals which are to be converted into acoustic waves by the transducer, and also to a receiver and processing stage for the reception and processing of the ultrasound echoes which occur after reflection of said waves from obstacles encountered in their propagation direction, said receiver and processing stage comprising an amplifier, a correction circuit for the correction of the gain as a function of time, and a processing circuit for the processing of the results of the echographic examination.

A device of this kind transmits ultrasound signals in the direction of the region to be examined, said signals being subsequently reflected by either mainly the numerous scatter points constituting this region or by the transition surfaces between successive objects having a different acoustic impedance. The echoes thus formed are converted into electric signals again in a receiver stage for the suitable processing of these signals, notably for the correction of the attenuation of the ultrasound waves as a function of the distance travelled by the ultrasound waves in the objects scanned.

A scanning device of this kind is described in U.S. Pat. No. 4,057,049. As appears from column 2, line 8 and further of this specification, a generator applies electric signals to a transducer which converts these signals into ultrasound waves of a given spectrum which propagate in the region to be scanned. Upon reception, the transducer again converts the echoes corresponding to the scatter points encountered or to the obstacles formed by the transition surfaces between different tissues into electric signals which are applied to an amplifier and subsequently, after correction of the ultrasound attenuation as a function of time, to an image display device.

It has been found that this ultrasound attenuation is larger as the frequency of the signals is higher. According to said patent specification, two comparatively narrow frequency bands are taken from the spectrum of the signal received and the local information present within these bands is used to modify the gain characteristic of the amplifier.

It is the object of the invention to provide a device which belongs to the same category as the described device, i.e. a device whose operation is based on the determination of a correlation between the frequency of the signal received and the amplitude thereof, however, this principle being used in a novel manner in order to reduce the variation of the frequency of the signals received in ultrasound echographic devices.

To this end, the device in accordance with the invention is characterized in that the receiver and processing stage also comprises, connected to the assembly formed by the amplifier and the gain correction circuit, means for determining the instantaneous frequency and the instantaneous energy of this echographic signal as well as means for weighting the instantaneous frequency with the instantaneous energy and means for diffraction correction.

The invention will be described in detail hereinafter with reference to the drawings; therein:

FIG. 2 shows an embodiment of the device in accordance with the invention;

FIGS. 3 and 4 show two alternatives for the demodulation and filter stage of the device shown in FIG. 2.

Figure 1A:
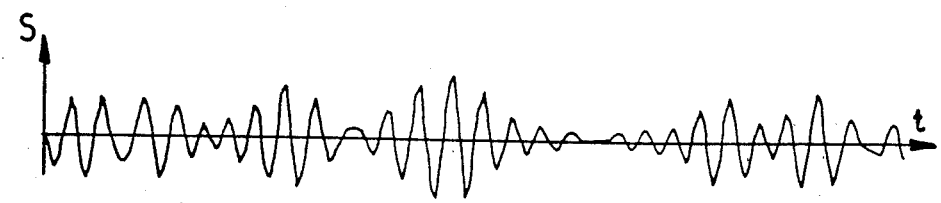
FIGS. 1a to 1c show the variation in time of the echographic signal received and the instantaneous frequency and the instantaneous energy thereof.
Figure 1B:
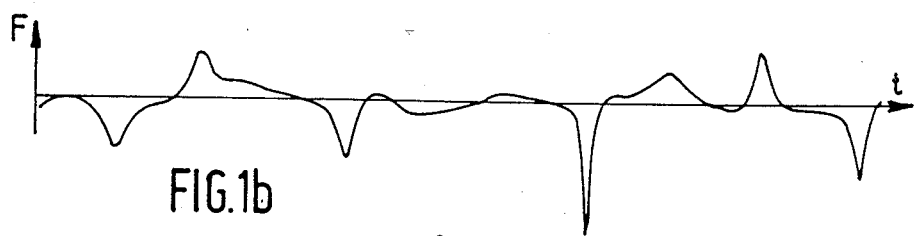
Figure 1C:
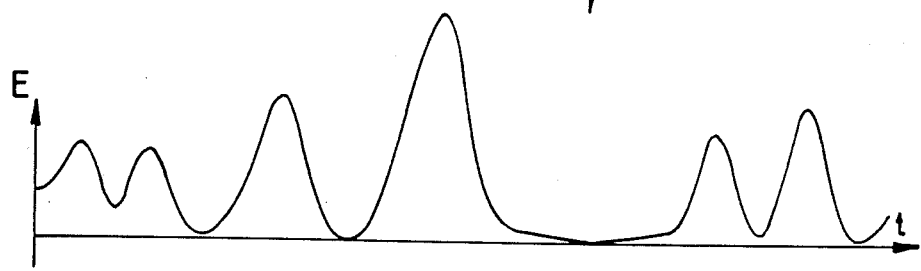

For a proper understanding of the invention it is to be noted that the echographic signal (FIG. 1a) received from scatter points during ultrasound echography results from the interference of a large number of echoes which are reflected by the obstacles or scatter points encountered. The fact that this echographic signal has an interference character is the cause of local variations in the instantaneous frequency (FIG. 1b) of this signal. It has been found that modulation dips occur (FIG. 1c) whose position in time is related to these local variations of the instantaneous frequency; the invention utilizes this relationship between these energy dips and frequency variations for calculating this frequency in a more reliable manner.

Therefore, the embodiment of the proposed device as shown in FIG. 2 comprises a single probe which supports an ultrasound transducer 10 and which serves to produce A-type echograms. However, it will be apparent that the invention can also be used when instead of a single line a complete slice of an object is examined, either by means of a manually displaced probe which is connected to a radar-type display device or which involves so-called sectorial mechanical angular displacement, or by means of a linear array of ultrasound transducers which define a number of scanning directions, said array being connected to a switching circuit whereby the echo receiving and processing device is successively connected to any given transducer or group of transducers, or by means of an array of transducers which involves so-called electronic sectorial scanning and which is also connected to a switching circuit and, moreover, to a network of delay lines or phase shifters.

The transducer 10 is connected on the one side to a transmitter stage 20 which is adapted to cause the repeated transmission of ultrasound signals by the transducer in an arbitrary scanning direction through the tissues to be scanned and on the other side to a receiver and processing stage 30. This receiver and processing stage 30 is adapted to receive and process the ultrasound echoes which are received by the transducer 10 and which correspond to the obstacles encountered by the acoustic waves in their propagation direction. These obstacles may be formed either by transitional surfaces between successive objects of different acoustic impedance or by the numerous scatter points liable to occur in the object scanned. Echoes of high amplitude which indicate the boundaries between objects will not be elaborated upon herein but only the effect of the scatter points where the useful scan is limited to a zone which is situated between two of such boundaries.

The receiver and processing stage 30 comprises a variable gain amplifier 40, a gain compensation circuit 50 for controlling the gain of this amplfier and, in the described embodiment, an image display device 60 for the display of the signals which are passed through the stage 30 in the form of an A-type echogram taken along an axis which corresponds to the principal propagation direction of the transducer 10. In accordance with the invention, the stage 30 comprises also a demodulation and filter stage 70 which is connected between the circuits 50 and 60 and which serves to demodulate and filter the echographic signal, and a diffraction correction stage which succeeds the stage 70.

The demodulation and filter stage 70 comprises two parallel-connected channels 110 and 210. The first channel 110 comprises a series connection of a circuit 120 for determining the instantaneous frequency of the echographic signal (such a circuit is listed, for example in the RCA catalogue as type No. CA 3089E), a multiplier 130 and a first low-pass filter 140 whose output signal is applied to a first input of a divider 90, the second channel comprising a series connection of a circuit 220 for determining the instantaneous energy of the echographic signal (such a circuit is listed, for example in the Motorola catalogue as type No. MC 1496) and a second low-pass filter 240 whose output signal is applied to the second input of the divider 90 (the filters 140 and 240 are identical). The output signal of the circuit 220 is also applied to the second input of the multiplier 130 of the first channel (this circuit 130 may be, for example the circuit MC 1494 listed in the Motorola catalogue).

The operation of this first embodiment in accordance with the invention is as follows. Because the echographic signal has been subjected to the effect of the gain compensation circuit, its mean energy will be constant in time, but its instantaneous energy locally deviates from this mean value; it has been found that such deviations are correlated with the local deviations of the instantaneous frequency (they indicate deviating values as has already been explained with reference to the FIGS. 1a to 1c): at a low energy, the variation of instantaneous frequency is large, whilst in the case of a high energy this value in nearer to the desired value. In accordance with the invention, therefore, the signal f(t) which is passed through the first channel 110 is weighted with the signal e(t) which is passed through the second channel 210 (this means that the frequencies corresponding to a high energy are favoured) via the connection between the output of the circuit 220 for determining the instantaneous energy and the second input of the multiplier 130 as shown in FIG. 2. Subsequently, the corrected output signal of the divider 90 is applied to the diffraction correction stage 80 connected to the output of the stage 70.

The diffraction correction stage of the present embodiment comprises an analog-to-digital converter 81 whose m digital output signals are applied to a digital memory 82, for example a programmable read-only memory (PROM). This memory also receives the n digital output signals of a counter 83 which is controlled by a clock circuit 84 which is started by the clock of the transmitter stage 20. The diffraction correction circuit 80 is required in an echography apparatus comprising a non-focussing transducer, and even more so in an apparatus comprising a focussing transducer, in order to compensate for the diffraction effect which is due to the fact that the dimensions of the transducer are not infinitely small and which falsifies the indications supplied by the demodulation and filter stage 70.

It can be demonstrated that the correction of this diffraction effect is bound only to the instantaneous frequency and to the distance, i.e. the time of flight, so that it can be performed, for example by storing in the memory m×n correction values obtained by calibration in advance, using m instantaneous frequency values f(t) and n distance values (assuming that the speed of the ultrasonic waves in the region examined is constant, the signals supplied by the counter 83 will be proportional to the distances travelled by these waves). In the present embodiment, this calibration phase utilizes the echographic responses of the transducer when the latter is arranged opposite phantoms of scattering objects.

The response thus obtained are thus used for introducing the diffraction correction values into the memory 82. As the case may be, the values thus output by the memory in reaction to one of the m frequency values and one of the n time of flight values may consist of, for example either a factor whereby the frequency value to be corrected must be multiplied (in which case a multiplier circuit must be connected to the output of the memory 82), or a difference whose algebraic value must be added to the frequency value to be corrected (in which case a summing circuit is connected to the output of the memory 82), or the value of the corrected frequency itself (this case corresponds to the example shown in FIG. 2); the foregoing alternatives are equivalent as regards the result obtained. Regardless of the alternative used, in all cases the output of the diffraction correction stage 80 is formed by a digital-to-analog converter 85 which is connected to the input of the image display device 60.

In an alternative embodiment of the stage 30 a non-linear interaction can be introduced between the instantaneous frequency and the instantaneous energy, for example by connecting a non-linear circuit, for example a threshold circuit, to the output of the circuit 220 for determining the instantaneous energy, said non-linear circuit conducting the instantaneous energy signal only if its value reaches a given threshold.

A second embodiment of the device in accordance with the invention comprises the same elements as shown in FIG. 2 with the exception of the demodulation and filter stage and the diffraction correction stage.

The modified demodulation and filter stage 470 now comprises (see FIG. 3) an analog-to-digital converter 471 whose outputs are connected to the inputs of a digital arithmetic circuit 472 for calculating the instantaneous frequency and the instantaneous energy at the successive sampling instants. The frequency and energy values thus periodically calculated are available on the output of the arithmetic circuit 472 on two parallel-connected channels 473 and 483. The first channel 473 successively comprises a digitally controlled multiplier 475 whose first input is, therefore, connected to the frequency output of the arithmetic circuit 472, and an adder circuit 476 whose output is connected to the diffraction correction stage (not shown) which is identical to the described stage 80, except that an analog-to-digital converter 81 need no longer be connected to its input because the preceding stage already supplies the data in digital form. The second channel 483 comprises a circuit for the indication of factors which is formed by a read-only memory 484 of the PROM type which supplies on the one hand a factor a which is applied to the second input of the multiplier 475 and on the other hand the complementary factor $b=1-a$ which is applied as a second input signal to a digitally controlled multiplier 485 whose first input signal is formed by the output signal of the adder circuit 460 which is passed through a delay circuit 486.

When $f_c(t_{N-1})$ and $f_c(t_N)$ are the values of the instantaneous frequency at the sampling instants $t_{N-1}$ and $t_N$, respectively, after weighting by means of the energy, and $f(t_{N-1})$ and $f(t_N)$ represent these values before weighting, in accordance with the diagram of FIG. 3 the formule for $f_c(t_N)$ is:

$$f_c(t_N) = af(t_N) + bf_c(t_{N-1}) \quad (2)$$

Tests performed by applicant have demonstrated that effective weighting is obtained for a factor a which is equal to e/e+1 (in which e(t) is the instantaneous energy).

The formule (2) can also be written as:

$$f_c(t_N) = af(t_N) + (1-a)f_c(t_{N-1})$$

or as $$f_c(t_N) = f_c(t_{N-1}) + a(f(t_N) - f_c(t_{N-1})). \quad (3)$$

Figure 4:
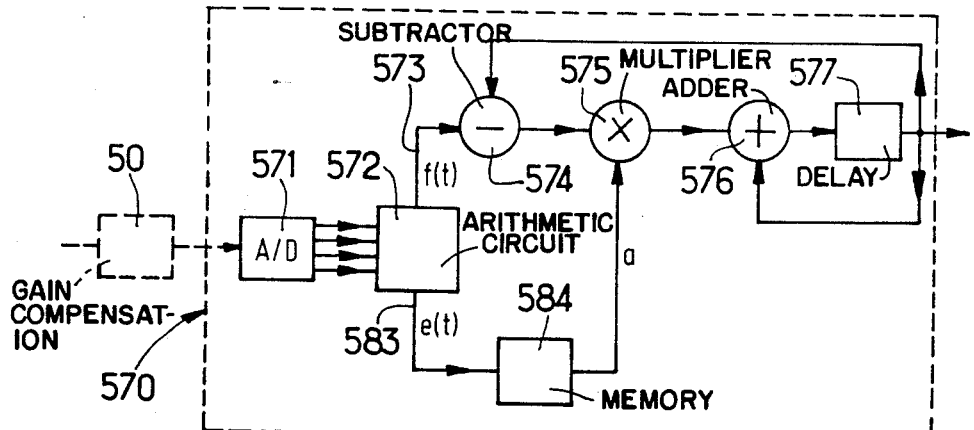

A third embodiment of the device in accordance with the invention corresponds to this formule (3); only its demodulation and filter stage deviates from that of the embodiment described with reference to FIG. 3. Therefore, FIG. 4 shows only this modified stage 570.

The demodulation and filter stage 570 comprises an analog-to-digital converter 571 whose outputs are connected, as in the previous case, to the inputs of a digital arithmetic circuit 572 for calculating the instantaneous frequency and the instantaneous energy (at successive sampling instants). The frequency and energy values calculated in this circuit are available on two parallel-connected channels 573 and 583; the channel 573 successively comprises a subtraction circuit 574, a multiplier circuit 575, an adder circuit 576 and a delay circuit 577, whilst the second channel 583 comprises a programmable read-only memory 584. The subtraction circuit 574 receives on the one hand the frequency output signal of the arithmetic circuit 572 and on the other hand the output signal of the adder circuit 576 which has been delayed in the circuit 577; it outputs the signal $f(t_N) - f_c(t_{N-1})$ which is applied to the first input of the multiplier circuit 575 whose second input receives the factor a which is supplied by the memory 584 as a function of the value of the energy on the input of this memory. The output signal a $[f(t_N) - f_c(t_{N-1})]$ of the amplifier circuit 575 is applied to the adder circuit 576 whose input also receives its own output signal which has been delayed in the circuit 577 and which outputs the signal $f_c(t_N)$ which is equal to $f_c(t_{N-1}) + [af(t_N) - f_c(t_{N-1})]$. This signal $f_c(t_N)$ is delayed in the circuit 577 and forms on the one hand the signal which is applied to the adder circuit 576 and the subtraction circuit 574 and on the other hand the output signal of the stage 570 which is applied to the input of the diffraction correction stage (not shown); this diffraction correction stage again corresponds to the stage 80, be it that the analog-to-digital converter 81 is absent at its input.

It will be apparent that the invention is by no means restricted to the described embodiments and that many alternatives are feasible without departing from the scope of the invention. It will notably be apparent from the foregoing examples that the invention in general concerns the modulation of frequency information by the energy information. Consequently, the invention can also be realized in a very simple form by means of an RC circuit which is connected in series with the channel for the instantaneous frequency, whilst the channel for the instantaneous energy is connected to the control terminal of the variable resistor R and the output signal of the circuit is extracted across the capacitor C.

What is claimed is:

1. A device for the scanning of objects by means of ultrasound echography, comprising at least one ultrasound transducer which is connected to a transmitter stage for the transmission of electric signals which are to be converted into acoustic waves by the transducer, and also to a receiver and processing stage for the reception and processing of ultrasound echoes which occur after reflection of said waves from obstacles encountered in their propagation direction, said receiver and processing stage comprising an amplifier, a correction circuit for the correction of the gain as a function of time, and a processing stage for processing of the results of the echographic examination, wherein as an improvement the receiver and processing stage comprises, connected to the assembly formed by the amplifier and the gain correction circuit, means for determining the instantaneous frequency and the instantaneous energy of the echographic signal, means for weighting the instantaneous frequency with the instantaneous energy, and means for diffraction correction.

2. A device as claimed in claim 1, wherein:
(A) the means for determining the instantaneous frequency and the instantaneous energy comprise: first and second parallel channels, the first channel comprising a circuit for determining the instantaneous frequency and the second channel comprising a circuit for determining the instantaneous energy;
(B) the means for weighting the instantaneous frequency with the instantaneous energy comprise: in the first channel a multiplier having a first input connected to the output of the circuit for determining the instantaneous frequency and an output is connected to a first low-pass filter, the output of the first filter being connected to a first input of a divider, and in the second channel a second low-pass filter which is identical to the first low-pass filter, having an input connected to the output of the circuit for determining the instantaneous energy and an output connected to a second input of the divider, a second input of the multiplier being connected to the output of the circuit for determining the instantaneous energy; and
(C) the means for diffraction correction comprise: an analog-to-digital converter which comprises m digital outputs, a counter which is controlled by a clock circuit and which comprises n digital outputs, a digital memory for the storage of m×n correction values, and an analog-to-digital converter having an output which supplies signals corrected for the diffraction effect.

3. A device as claimed in claim 1, further comprising:
an analog-to-digital converter connected to the output of the gain compensation circuit and a digital arithmetic circuit for calculating the instantaneous frequency and the instantaneous energy, the output signals of the arithmetic circuit being available on first and second, parallel-connected channels,
the first channel successively comprising: a first digitally controlled multiplier circuit and an adder circuit,
the second channel comprising: a memory for supplying a digital factor a which is applied to the first multiplier circuit and a complementary factor b=1−a which is applied as a second input signal to a second multiplier; the first input of the second multiplier circuit being connected to receive via a delay circuit, the output signal of the adder circuit, the output of the adder circuit also being applied to the input of the means for diffraction correction.

4. A device as claimed in claim 1, further comprising:
an analog-to-digital converter connected to the output of the gain compensation circuit and a digital arithmetic circuit for calculating the instantaneous frequency and the instantaneous energy, the output signals of the arithmetic circuit being available on first and second parallel-connected channels,
the first channel successively comprising: a subtraction circuit, a multiplier circuit, an adder circuit and a delay circuit, the output signal of said delay circuit being applied as a second input signal to the subtraction circuit and to the adder circuit,
the second channel comprising: a memory which supplies a factor a which is applied to the second input of the multiplier circuit,
the output signal of the delay circuit also being applied to the input of the means for diffraction correction.

* * * * *